United States Patent Office 3,227,680
Patented Jan. 4, 1966

---

3,227,680
HEAT STABILIZATION OF POLYESTERS
WITH BUILT-IN STABILIZERS
John W. Tamblyn, Charles J. Kibler, and Alan Bell, Kingsport, Tenn., assignors to Eastman Kodak Company, Rochester, N.Y., a corporation of New Jersey
No Drawing. Filed Mar. 7, 1961, Ser. No. 93,855
13 Claims. (Cl. 260—47)

This invention relates to the heat stabilization of synthetic linear polyesters and more particularly to the introduction of a heat stabilizer into the polyester material in such a manner that when products such as fibers and other shaped articles are produced therefrom, the heat stabilizer cannot be dissolved, washed or volatilized out of the material under the usual conditions met with in use and in cleaning, washing, drying, pressing, ironing and the like.

It is known that heating in the presence of air or an oxygen-containing atmosphere tends to chemically break up or degrade linear polyester materials used in the production of textile fibers, especially in such processes as washing, drying at elevated temperatures, ironing and pressing. Similarly, linear polyester material used in film and shaped articles such as electrical insulators and the like are subject to breakdown by heat in uses to which they are ordinarily put. The degrading effect of heat on polyesters has been discussed by H. A. Pohl in the Journal of the American Chemical Society 73, 5660-5661 (1951), and by I. Marshall and A. Todd in Transactions of the Faraday Society 49, 67–78 (1953). For example, when polyesters are heated at elevated temperatures, they degrade in physical properties and in molecular weight as measured by the inherent viscosity $[\eta]$ defined by the equation $$[\eta] = \frac{\ln (\eta/\eta_0)}{C}$$

where $\eta_0$ and $\eta$ are the viscosities, respectively, of pure solvent and of a solution containing C grams of polymer per 100 cc. of solvent. The inherent viscosities reported herein were measured in a 60:40 mixture by weight of phenol:tetrachloroethane at a polymer concentration of about 0.23 gram/100 cc.

It has been shown by Lappin and Moore in U.S. Patent 2,835,648 that when a gentisic acid derivative such as gentishydrazide or gentisanilide is mixed mechanically with a molten polyester or is added thereto by adding the derivative to a solution of the polymer and articles fabricated therefrom, the added material serves to protect the polymeric material against degradation by heat. However, it has been found that heat-stabilizing substances thus added to synthetic polymers by physical admixture or solution have a tendency to volatilize or are subject to loss by being leached out of the material when it is washed or otherwise treated with water or organic liquids, especially when the polymer is in the form of fibers or thin films. For example, when the known heat-stabilizers are simply added to or mechanically mixed with the polyester material and textile fibers spun therefrom, it has been found that the additive is lost or depleted in the usual processes of washing, dry cleaning, pressing, ironing and the like. The present invention serves to overcome this inherent deficiency in heat-stabilized polyesters and products produced therefrom.

It is accordingly the principal object of the invention to provide a means of stabilizing a linear polyester against oxidative degradation by heat without the possibility of loss of the heat-stabilizing means.

Another object is to provide polyester fibers, films, sheets and shaped articles which have high and permanent resistance to oxidative degradation by heat.

Another object is to provide heat-stabilized polyester fibers which can be washed, dried, pressed or ironed at relatively elevated temperatures without loss of heat stabilizer.

Another object is to provide heat-stabilized polyester shaped articles which are not subject to loss of the heat stabilizing agent under the heating ordinarily encountered in the uses to which such articles are put.

Other objects will appear hereinafter.

These objects are accomplished by the following invention which in its broader aspects comprises chemically incorporating a heat-stabilizing compound into a polyester material so that the polyester and the heat stabilizer are in fact one chemical compound. In other words, we have provided what is, in fact, a new composition of matter, that is, a new polyester with a chemically built-in heat stabilizer which is not subject to loss through exudation, volatilization or leaching or by application of heat during use or in dry cleaning, washing, drying, ironing or pressing.

The above and other objects of the invention are accomplished, according to one embodiment thereof, by chemically combining a linear polyester such as poly(ethylene terephthalate) and poly(1,4-cyclohexylenedimethylene terephthalate) with a hydroquinone compound containing one or two ester-forming groups in addition to the two phenolic hydroxyl groups. These hydroquinone compounds are thus either monofunctional or bifunctional in that they contain functional groups which can attach themselves chemically to the polymer chain of the polyester. That is, when these compounds contain one ester-forming group, they are monofunctional and when they contain two ester-forming groups, they are bifunctional. Examples of ester-forming groups are carboxy, carbalkoxy, hydroxyalkyl or acyloxyalkyl. According to our invention the hydroquinone compounds of particular efficacy in heat stabilization of linear polyesters in the presence of oxygen or an oxygen-containing atmosphere may be represented by the following typical compounds: Gentisic acid,

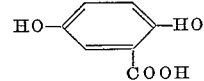

or a substituted gentisic acid such as

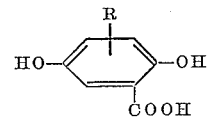

wherein R may be an alkyl group of 1–12 carbon atoms, hydroxyl, alkoxy and acyloxy, 2,5-dihydroxyterephthalic acid,

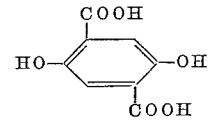

2,5-dihydroxyisophthalic acid

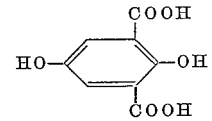

3,6-dihydroxylphthalic acid

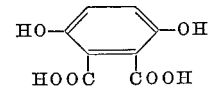

2,5-bis(hydroxyalkoxy)hydroquinones such as

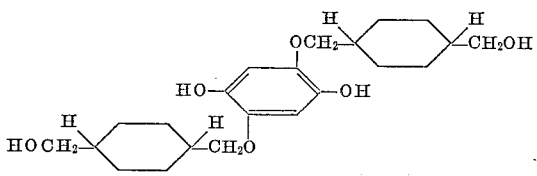

or isomers thereof, and 2,5-bis(hydroxyalkoxy)hydroquinone

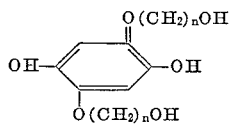

wherein $n$ is an integer from 2–12 carbon atoms and 2,5-bis(carboxymethyl)hydroquinone

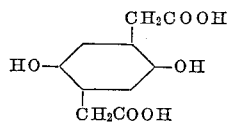

In employing the above hydroquinone compounds in accordance with our invention, we are, as will be evident as the description proceeds, actually producing a new polymeric material in that the hydroquinone compound becomes a part of the polyester chain by esterification. Thus, as indicated above, the hydroquinone compound, whether monofunctional or bifunctional, actually combines chemically with the polymeric material of the polyester chain and is "built into" it and forms an indissoluble part thereof. This is the particular feature of novelty of our invention and distinguishes it from all other techniques of the heat stabilization of polyesters in which the heat stabilizing agent is merely added by mechanical mixing or by treating the polyester with a solution of the stabilizer.

These new heat stabilized compositions of matter which form the subject of this invention may be prepared by reacting one or more of the aforementioned substituted hydroquinone compounds and one or more dibasic acids with one or more glycols. Particularly useful in the practice of this invention for the formation of linear polyesters are the aromatic dicarboxylic acids such as phthalic acid, isophthalic acid, terephthalic acid, 4,4'-diphenic acid, p,p'-sulfonyldibenzoic acid, 4,4'-carbonyldibenzoic acid, etc. Examples of other bifunctional dibasic acids which are adapted to the formation of linear polyesters which can be employed in accordance with this invention as described above are oxalic acid, carbonic acid, succinic acid, adipic acid, pimelic acid, subaric acid, azelaic acid, sebacic acid, alpha-ethylsuberic acid, 1,4-cyclohexanedicarboxylic acid, 1,3-cyclohexanedicarboxylic acid, etc.

Examples of glycols which can be employed in accordance with this invention include the cyclohexanedimethanols such as 1,1; 1,2; 1,3 and 1,4-cyclohexanedimethanols as well as the polymethylene glycols containing from 2 to 10 or more carbon atoms such as ethylene glycol, 1,5-pentanediol and other glycols of this series as well as ether glycols such as diethylene glycol, triethylene glycol, poly(tetramethylene glycol) and the like. Branched chain aliphatic glycols which can be employed include 2,2-dimethyl-1,3-propanediol, 2-methyl-1,5-pentanediol, etc.

The procedures for producing polyesters from the above mentioned compounds are well-known in the art and detailed description thereof is unnecessary. For example, linear polyesters such as polyethylene terephthalate, may be prepared in accordance with the process described in Whinfield and Dickson U.S. Patent 2,465,319. Similarly, a linear polyester such as poly(1,4-cyclohexylenedimethylene terephthalate) may be prepared in accordance with the process described in Kibler, Bell and Smith U.S. Patent 2,901,466. Likewise, polyesters of 4,4'-sulfonyldibenzoic acid may be prepared in accordance with the process of Caldwell U.S. Patent 2,744,089.

The preparation of the linear polyesters, modified in accordance with our invention, differs from the procedures described in the above-mentioned patents basically in that the heat stabilizing hydroquinone compound is added to the reaction mixture and becomes incorporated in the polymer chain. For example and referring to U.S. Patent 2,901,466, typical reactions in accordance with our invention may be illustrated by the following,

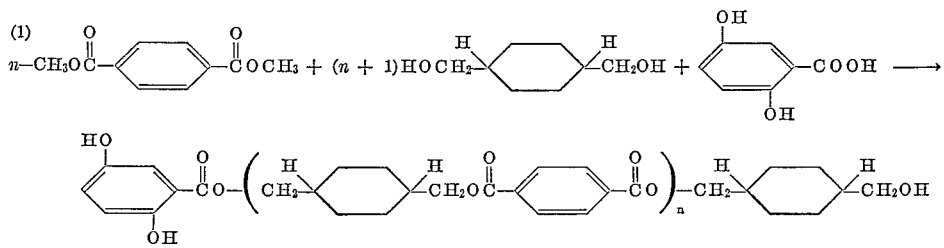

when a monofunctional stabilizer such as gentisic acid is present in the ratio of one molecule per average polyester unit.

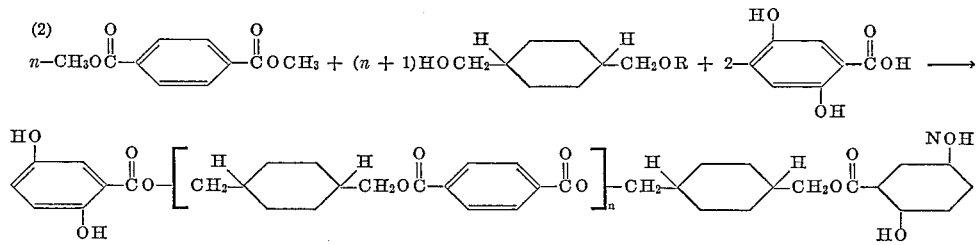

when two molecules of monofunctional stabilizer are present for each polyester unit.

(3)

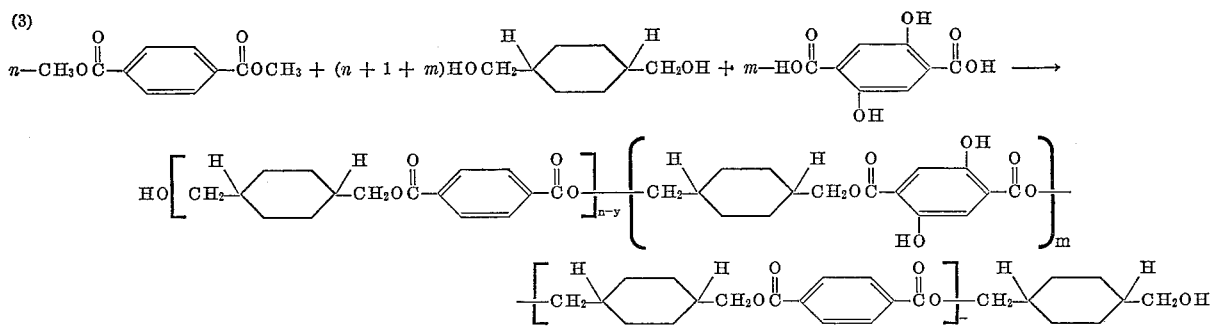

when a bifunctional stabilizer such as 2,5-dihydroxyterephthalic acid is present. In the above examples, $n$ is an integer greater than about 20, while $y$ is any integer less than the value of $n$, and $m$ is an integer from 1 to about 5.

As will be evident from the above equations, the heat-stabilizing hydroquinone compounds employed in accordance with our invention may contain either monofunctional or bifunctional groups. It will be noted that those derivatives which contain a monofunctional stabilizer molecule serve as a chain terminator as illustrated in Equations 1 and 2 above, while those hydroquinone derivatives having two functional groups may appear anywhere in the polyester chain.

It should be noted that these "$m$" units of stabilizers need not occur in adjacent positions as indicated by Equation 3, but may be distributed at random throughout the chain. In either case and in accordance with our invention, the heat stabilizing compound or unit is chemically united to the polymeric material which constitutes the polymer chain.

Referring to the use of the monofunctional compound as in Equations 1 and 2, for example, if gentisic acid is employed as the heat stabilizer in the ratio of one gentisic acid molecule for each polyester molecule, then any given polyester chain may be (1) terminated at both ends, (2) terminated at only one end, (3) terminated at neither end. Thus, three types of molecules may be present in any given preparation. In regard to the bifunctional compounds, the number of stabilizing units present in any given chain may be 0, 1, 2, 3, etc.

It should be noted in this connection that the termination reaction itself is not important. Since terminators not derived from hydroquinone, such as salicylic acid, benzoic acid, toluic acid, etc., which do not contain the stabilizing function, do not increase the heat stability of the polyester. This can be readily seen from Table 2 of Example 11. Furthermore, compounds which do not terminate the polymer chain, such as 2,5-bis[(4-hydroxymethyl)cyclohexylmethoxy] hydroquinone, 2,5-bis($\beta$-hydroxyethoxy) hydroquinone and 2,5-bis(carboxymethyl) hydroquinone, are nevertheless active stabilizers when employed in accordance with our invention.

In practicing our invention in making the stabilized polyester, we add to the reaction mixture an amount of the hydroquinone compound equivalent to about .01 mole percent to 5 mole percent based on the polyester building unit and preferably 0.1 mole percent to 2.0 mole percent.

In the following examples and description, we have set forth several of the preferred embodiments of our invention; but they are included merely for purposes of illustration and not as a limitation thereof.

PREPARATION OF POLYESTERS

*Example 1*

A mixture of 19.4 g. (0.1 mole) of dimethyl terephthalate, 17.2 g. (0.12 mole) of 1,4-cyclohexanedimethanol, and 0.154 g. (0.001 mole) of gentisic acid, and 0.1 ml. of titanium tetraisopropoxide in butanol containing 4.8% of titanium metal was heated 1 hour at 200 to 250° C. to complete the ester interchange. The temperature was then increased to 290–300° C., and then a vacuum was applied. After 5 minutes under full vacuum, the reaction was let to nitrogen and poured into water. The prepolymer was ground to a powder and polymerized in the solid phase for 3 hours at 280° C. under a pressure of 0.08 mm. of mercury. The resulting polyester had an inherent viscosity of 0.95 (60:40 phenol:tetrachloroethane).

Alternatively the polyester may be prepared in the melt phase by using a high vacuum at 290–300° C. for 1 hour.

*Example 2*

A mixture of 19.4 g. (0.1 mole) of dimethyl terephthalate, 17.2 g. (0.12 mole) of 1,4-cyclohexanedimethanol, and 0.196 g. (0.001 mole) of propyl gentisate, and 0.1 ml. of a 28% solution of $Mg[HTi(OC_3H_7)_6]_2$ in isopropanol was heated for 1 hour at 200° C. to 250° C. to complete the ester interchange. The temperature was increased to 300° C., and then a vacuum of 0.01 mm. of Hg was applied. After stirring for 1 hour at this temperature, a viscous polyester was obtained which had an inherent viscosity of 0.83 and contained 1 gentisic radical for every 100 terephthalic radicals, i.e., contained 1.0 mole percent of gentisic acid.

*Example 3*

A polyester was prepared as in Example 2 using 15.5 g. (0.08 mole) of dimethyl terephthalate, 3.88 g. (0.02 mole) of dimethyl isophthalate, 18.2 g. (0.13 mole) of 1,4-cyclohexanedimethanol, 0.46 g. (0.003 mole) of gentisic acid, and 0.1 ml. of a 28% solution of $$NaHTi(OC_3H_7)_6$$

in butanol as catalyst. The final polyester had an inherent viscosity of 0.93.

*Example 4*

A polyester was prepared as in Example 2 using 0.1 mole of dimethyl terephthalate, 0.12 mole of 1,4-cyclohexanedimethanol and 0.1 ml. of a 28% solution of titanium tetraisopropoxide but employing 0.001 mole of 2,5-dihydroxy-3-tertiary butylbenzoic acid as the stabilizer. This polyester was polymerized in the solid phase to an inherent viscosity of 0.86.

*Example 5*

A polyester was prepared as in Example 2 using 0.10 mole of dimethyl terephthalate, 0.14 mole of 1,4-cyclohexanedimethanol, and 0.1 ml. of a 28% solution of titanium tetraisopropoxide in isopropanol as catalyst, but employing 0.002 mole of 2,5-dihydroxy terephthalate as stabilizer. The resulting polyester had an inherent viscosity of 0.76.

*Example 6*

A polyester was prepared as in Example 2 using 0.10 mole dimethyl terephthalate, 0.12 mole of 1,4-cyclohexanedimethanol, and 0.2 ml. of a 10% solution of lithium methoxide in methanol as catalyst, but employing 0.002 mole of 2,5-bis[4-(hydroxymethyl)-cyclohexylmethoxy]-1,4-hydroquinone as stabilizer. The polyester thus obtained had an inherent viscosity of 0.90.

Example 7

A polyester was prepared as in Example 2 using 0.083 mole of dimethyl terephthalate, 0.017 mole of dimethyl isophthalate, 0.12 mole of 1,4-cyclohexanedimethanol, 0.001 mole of gentisic acid and 0.1 ml. of a 28% solution of $Mg[HTi(OC_3H_7)_6]_2$ in isopropanol as catalyst. The resulting polyester had an inherent viscosity of 0.70.

Example 8

A mixture of 14.5 g. (0.075 mole) of dimethyl terephthalate, 54 g. (0.025 mole) of dimethyl azelate, 0.196 g. (0.001 mole) of propyl gentisate and 0.1 ml. of a 28% solution of $Mg[HTi(OC_3H_7)_6]_2$ in isopropanol were treated in the manner described in Example 2. The resulting polyester had an inherent viscosity of 0.96.

Example 9

A polyester was made as in Example 2 using 0.075 mole of dimethyl terephthalate, 0.025 mole of dimethyl isophthalate, 0.20 mole of ethylene glycol and 0.001 mole of gentisic acid. The polymerization was carried out at 200–275° C. in the melt phase using 0.1 ml. of a 28% titanium tetraisopropoxide in isobutanol.

Example 10

A polyester was prepared from 0.1 mole of dibutyl-4,4'-sulfonyldibenzoate, 0.15 mole of 1,5-pentanediol and 0.002 mole of propyl gentisate using 0.2 ml. of a 14% solution of $NaHTi(OC_3H_7)_6$ in butanol as catalyst.

Example 11

A mixture of 0.083 mole of dimethyl terephthalate, 0.017 mole of dimethyl isophthalate, 0.012 mole of 1,4-cyclohexanedimethanol and 0.1 ml. of a 28% solution of $Mg[HTi(OC_3H_7)_6]_2$ in isopropanol, without the incorporation of a hydroquinone stabilizer, was polymerized as described in Example 2. This polyester had an inherent viscosity of 0.72.

TESTING OF THE POLYESTERS

Example 12

The polyesters as listed in Table 1 were compression molded into films 1 mil. thick and tested for oxidative stability. The test consisted of heating in a mechanical convection air oven for 15 hrs. at 185° C. and evaluating the molecular weight breakdown by means of inherent viscosity measurements. The effectiveness of these built-in stabilizers is shown by the relatively low amount of viscosity breakdown which occurred as compared with the unstabilized composition illustrated by the polyester of Example 11.

TABLE 1

| Polyester of— | Mole percent additive | Inherent viscosity | | Percent viscosity breakdown |
|---|---|---|---|---|
| | | Original | After 15 hrs. at 185° C. | |
| Example 11 | None | 0.82 | 0.43 | 48 |
| Example 1 | a 1 | 0.76 | 0.73 | 4 |
| Example 3 | a 3 | 0.83 | 0.81 | 2 |
| Example 4 | b 1 | 0.78 | 0.74 | 5 |
| Example 5 | c 2 | 0.74 | 0.70 | 5 |
| Example 6 | d 2 | 0.76 | 0.75 | 1 |
| Example 8 | a 1 | 0.86 | 0.80 | 7 |
| Example 9 | a 1 | 0.71 | 0.70 | 1 |
| Example 10 | a 2 | 0.75 | 0.70 | 7 | a Gentisic acid.
b 2,5-dihydroxy-3-tert. butylbenzoic acid.
c 2,5-dihydroxyterephthalic acid.
d 2,5-bis[4-hydroxymethyl)cyclohexylmethoxy]1,4-hydroquinone.

Example 13

The polyester of Example 11 was melt spun at 295° C. into yarn having an inherent viscosity of 0.55. The yarn was drafted at 110° C. to 5 times its initial length. A second yarn was similarly spun and drafted from a slurried mixture of the polyester of Example 11 with 1.0 mole percent of gentisic acid. A third yarn was similarly prepared from the polyester of Example 7 with the 1% built-in gentisic acid stabilizer.

These yarns were heated in an air oven at 160° C. for 425 hours. Their tensile strengths and elongations were measured before and after this treatment. These data, along with calculated percentage retention of original tensile strength and elongations, are given in Table 2.

TABLE 2

| Yarn | Yarn properties | | | | Percent retention of initial property | |
|---|---|---|---|---|---|---|
| | Before heating | | After 425 hr. at 160° C. | | Tensile strength | Elongation |
| | Tensile strength | Elongation | Tensile strength | Elongation | | |
| Unstabilized polyester (Example 11) | 2.78 | 9.1 | 1.62 | 4.0 | 58 | 44 |
| Polyester of Example 11 with gentisic acid slurry added before spinning | 1.62 | 15 | 0.96 | 3.0 | 59 | 20 |
| Stabilized polyester of Example 7 with chemically "built in" gentisic acid stabilizer | 2.87 | 8.8 | 2.28 | 7.0 | 79 | 80 |

The superiority of the yarn containing the "built-in" stabilizer is evident from the data shown in the above table.

Example 14

The polyesters listed in Table 3 were prepared by the procedure of Example 7 with chemically built-in additives. Polyester A is the polyester of Example 11 and contains no stabilizer. Polyesters B, C, D, E and F contain the built-in stabilizers in the amounts shown. Polyesters G, H, I and J contain built-in benzoic acid terminators which do not contain the hydroquinone functionality.

Films 1 mil thick were compression molded from these polyesters and tested for oxidative stability. The test consisted of heating in a mechanical convection air oven for 15 hours at 185° C. and evaluating the molecular weight breakdown by means of inherent viscosity measurements. The inherent viscosity values before and after heating are given in Table 2 along with the percentage viscosity breakdowns caused by the exposure to hot air.

TABLE 3

| Additive | Mole percent additive | Inherent viscosity | | Viscosity breakdown |
|---|---|---|---|---|
| | | Original | After heating 15 hrs. at 185° C. | |
| A. None | | 0.82 | 0.43 | 48 |
| B. Gentisic acid | 0.1 | 0.87 | 0.80 | 8 |
| C. Gentisic acid | 0.5 | 0.82 | 0.73 | 11 |
| D. Gentisic acid | 0.5 | 0.81 | 0.83 | 0 |
| E. Gentisic acid | 1.0 | 0.58 | 0.55 | 5 |
| F. 2,5-dihydroxy terephthalic acid | 1.0 | 0.70 | 0.68 | 3 |
| G. β-Resorcylic acid | 1.0 | 0.76 | 0.51 | 33 |
| H. Salicylic acid | 1.0 | 0.91 | 0.51 | 44 |
| I. Methyl salicylate | 1.0 | 0.97 | 0.51 | 47 |
| J. Benzoic | 1.0 | 0.85 | 0.43 | 49 |

The lack of effectiveness as shown in the above table of salicylic, β-resorcylic and benzoic acids indicates that mere chain termination does not contribute to the oxidative stability of the polyester.

*Example 15*

The polyesters listed in Table 4 were prepared by the procedure of Example 7 with chemically "built-in" additives as noted. These polyesters were melt-extruded in the form of sheets which were two-way-stretched and cyrstallized to give films 1.5 mils in thickness. The oxidative stability of these films was determined by suspending them in a mechanical convection air oven at 160° C. for various lengths of time and following the deterioration by means of elongation measurements. The initial elongations of these films, before oven exposure, were 50 to 55%.

TABLE 4

| Additive | Mole percent additive | Percent original elongation retained after oven exposure of— | | |
|---|---|---|---|---|
| | | 2 days | 4 days | 8 days |
| None | | 50 | 14 | 0 |
| Gentisic acid | 0.5 | 81 | 69 | 31 |
| 2,5-dihydroxy terephthalic acid | 0.25 | 78 | 70 | 30 |

While we have found it convenient to illustrate our invention by the stabilization of certain specific polyesters such as poly(ethylene terephthalate), poly(1,4-cyclohexylenedimethylene terephthalate), poly(pentamethylene 4,4'-sulfonyl dibenzoate) and the like, it will be apparent to those skilled in the art and to which this invention relates that other polyesters may be stabilized against oxidative thermal degradation by empolying the stabilizers and procedures of our invention as herein described. Similarly, while we have found it convenient to illustrate our invention by reference to the employment of certain specific mono- and bifunctional hydroquinone compounds, it will be evident that other hydroquinone compounds falling within this broad category may be employed with equally satisfactory results.

It is to be noted that the particular feature of novelty of our invention is the fact that the heat-stabilizing compounds are acually built into and form a part of the polymer chain of the polyester. Thus, we have produced polyester compositions stabilized against oxidative degradation under the influence of heat which are, in fact, new compositions of matter and in which the stabilizing agents cannot exude from, be leached out of, volatilized or otherwise removed from the polyester material since they form an actual part of the polyester molecule.

It will also be apparent that our invention makes possible the production of various shaped articles from polyester materials which will remain stabilized against oxidative degradation under the influence of heat and in which the stabilizing material is not susceptible of removal under the conditions of use to which such articles are subjected. For example, whereas in the production of heat-stabilized fibers as heretofore produced, it has been extremely difficult, if not impossible, to retain the heat-stabilizing material in the fibers because of the large amount of surface exposed and the effect of various dry cleaning solvents, detergents and other agents employed in the washing, drying and cleaning of textile materials. Our invention has completely eliminated these difficulties and has made possible the production of fibers which are, not only permanently stabilized against oxidative deterioration under heat but also are not susceptible of loss of the stabilizing agent by the application of dry cleaning solvents, detergents and the like.

Our invention also finds special usefulness in the production of shaped objects such as films and sheets of various thickness, molded objects and the like. For the same reasons as pointed out in connection with heat-stabilized fibers, films which are subject to treatment in various solvents or aqueous media have a tendency to lose heat stability if the heat stabilizer is mechanically mixed therewith, whereas similar articles produced in accordance with our invention are not subject to loss of the heat stabilizer for the reasons indicated above.

Although the invention has been described in considerable details with particular reference to certain preferred embodiments thereof, variations and modifications can be effected within the spirit and scope of the invention as described hereinabove and as defined in the appended claims.

We claim:

1. A fiber forming linear polyester which is stable against oxidative deterioration under the influence of heat comprising a highly polymeric condensation polymer of three classes of constituents wherein the presence of phenolic hydroxy groups is limited to class (C), said classes being (A) at least one bifunctional dibasic acid having carboxy radicals as the sole functional groups, (B) at least one bifunctional glycol having hydroxy radicals as the sole functional groups, and (C) .01–5 mole percent of a ring substituted hydroquinone compound having ring-substituted thereon at least one ester-forming group in addition to the two phenolic hydroxy groups of said hydroquinone compound, each of said ester-forming groups having a terminal radical selected from the group of radicals consisting of carboxy, carbalkoxy and hydroxyalkyl radicals, said hydroquinone compound being chemically combined through the said ester-forming groups into a linear polyester of constituents consisting essentially of said classes (A), (B), and (C), said phenphenolic hydroxy groups of said class (C) constituent remaining essentially uncombined.

2. A fiber forming linear polyester which is stable against oxidative deterioration under the influence of heat comprising a highly polymeric condensation polymer of three classes of constituents wherein the presence of phenolic hydroxy groups is limited to class (C), said classes being (A) at least one bifunctional dibasic acid having carboxy radicals as the sole functional groups, (B) at least one bifunctional glycol having hydroxy radicals as the sole functional groups, and (C) .01–5 mole percent of a ring substituted hydroquinone compound having ring-substituted thereon two ester-forming groups in addition to the two phenolic hydroxy groups of said hydroquinone compound, each of said ester-forming groups having a terminal radical selected from the group of radicals consisting of carboxy, carbalkoxy and hydroxyalkyl radicals, said hydroquinone compound being chemically combined through the said ester-forming groups into a linear polyester of constituents consisting essentially of said classes (A), (B), and (C), said phenolic hydroxy groups of said class (C) constituent remaining essentially uncombined.

3. A linear polyester of claim 1 in which component (A) is at least one aromatic dicarboxylic acid.

4. A linear polyester of claim 1 in which component (A) is at least 25 mole percent of an aromatic dicarboxylic acid.

5. A linear polyester as defined in claim 1 wherein component (A) is at least 25 mole percent of an aromatic dicarboxylic acid and (B) is 1,4-cyclohexanedimethanol.

6. A polyester as defined in claim 2 wherein component (A) is at least 25 mole percent of an aromatic dicarboxylic acid and (B) is 1,4-cyclohexanedimethanol.

7. A linear polyester of claim 1 in which component (C) is gentisic acid.

8. A linear polyester of claim 2 in which component (C) is 2,5-dihydroxyterephthalic acid.

9. A linear polyester of claim 2 in which component (C) is 2,5-bis(hydroxyalkoxy) hydroquinone.

10. A linear polyester as defined in claim 1 wherein component (A) is terephthalic acid, component (B) is 1,4-cyclohexanedimethanol and component (C) is gentisic acid.

11. A linear polyester as defined in claim 1 wherein component (A) is terephthalic acid, component (B) is 1,4-cyclohexanedimethanol and component (C) is 2,5-dihydroxyterephthalic acid.

12. A linear polyester as defined in claim 2 wherein component (A) is terephthalic acid, component (B) is 1,4-cyclohexanedimethanol and component (C) is 2,5-bis[4-(hydroxymethyl)-cyclohexylmethoxy] - 1,4 - hydroquinone.

13. A linear polyester as defined in claim 1 wherein component (A) is a mixture of terephthalic acid and isophthalic acid, component (B) is 1,4-cyclohexanedimethanol and component (C) is gentisic acid.

References Cited by the Examiner
UNITED STATES PATENTS

| | | | |
|---|---|---|---|
| 2,331,169 | 10/1948 | Bruson | 260—47 |
| 2,887,468 | 5/1959 | Caldwell et al. | 260—47 |
| 2,894,984 | 7/1959 | Hauptschein | 260—47 |
| 2,901,466 | 8/1959 | Kibler et al. | 260—75 |
| 2,953,544 | 9/1960 | Hedrick | 260—47 |
| 3,047,536 | 7/1962 | Gordon | 260—47 |
| 3,056,761 | 10/1962 | Griehl | 260—47 |
| 3,088,933 | 5/1963 | Ottman | 260—75 |

WILLIAM H. SHORT, *Primary Examiner.*

P. MANGAN, LOUISE P. QUAST, *Examiners.*

UNITED STATES PATENT OFFICE
CERTIFICATE OF CORRECTION

Patent No. 3,227,680 January 4, 1966

John W. Tamblyn et al.

It is hereby certified that error appears in the above numbered patent requiring correction and that the said Letters Patent should read as corrected below.

Column 10, line 55, strike out "phen-"; column 11, line 26, for the claim reference numeral "1" read -- 2 --.

Signed and sealed this 10th day of January 1967.

(SEAL)
Attest:

ERNEST W. SWIDER
Attesting Officer

EDWARD J. BRENNER
Commissioner of Patents